Patented Apr. 3, 1945

2,372,996

UNITED STATES PATENT OFFICE 2,372,996

METHOD OF TREATING SUGAR MELTS

Leonard Wickenden, Manhasset, N. Y.

No Drawing. Application July 7, 1942,
Serial No. 450,048

7 Claims. (Cl. 127—55)

This invention relates to the refining of sugar syrups or melts, and has for its object certain improvements in the method of treating sugar syrups or melts to remove objectionable impurities therefrom.

It is common practice to purify sugar syrups or melts by filtering through cylindrical containers filled with granular bone-char. The sugar syrup or melt is allowed to flow by gravity through the bed of char, and it is not uncommon to use as much as 50 lbs. of char, or even more, for every 100 lbs. of sugar treated. The impurities removed are largely of a colloidal character and bone-char has an especial affinity for irreversible colloids.

It is also common practice to treat sugar syrups or melts with powdered activated carbon for the same purpose, the mixture being filter-pressed to separate the filtrate from the activated carbon and its adsorbed impurities. To obtain an equally satisfactory liquor with activated carbon alone, it is sometimes necessary to use as much as 2.5 lbs. of carbon for every 100 lbs. of sugar treated. Carbons of this type have an especial affinity for reversible colloids, so that bone-char and activated carbon are to a large extent supplementary in their action.

While not common practice, it has been proposed to treat sugar syrups or melts with bone char and then with activated carbon. It has been found that when this is done the amount of bone char may be reduced to as little as 10% and the amount of activated carbon to 0.4% or even less. Owing to the fact that both reversible and irreversible colloids are removed from the crude liquor, smoother boiling is subsequently obtained in the evaporating pans, and the sugar produced is whiter and more sparkling. This is especially true of later strikes, that is, the sugar boiled from the mother liquor from first and successive strikes.

In spite of such marked economies in bone char and activated carbon consumption, and with the other advantages obtained, bone char refiners find it economically inadvisable to change their practice because it would render useless about two-thirds of their bone char filters. These filters, taken in conjunction with the revivifying kilns needed to supply them with clean bone char, represent a substantial investment, and in their place it would be necessary to install an expensive filter press station to handle the activated carbon. This would represent a further large investment. The economic objections to the change from bone char to bone char-activated carbon are so great that they are thought to out-weigh the technical advantages.

To overcome these objections, it has been proposed first to filter the sugar syrup or melt through a bone char filter, and then through a similar filter loaded with sand admixed with activated carbon; using, for example, about 2 parts by weight of activated carbon to 100 parts by weight of sand. Certain difficulties, however, are encountered which make the proposal impractical. A sharp change in the rate of flow of the sugar syrup or melt through the filter is invariably followed by the loosening of the carbon on the sand particles, with a resulting black filtrate. In some instances, after several minutes, the filtrate begins to clear and runs carbon-free for a while, until some other change in conditions occurs, and once again a black filtrate is obtained. So much carbon is loosened under these conditions that it frequently forms a coating over the blanket at the bottom of the filter, partially or completely plugging it and making further filtration impossible.

An even more serious disadvantage from the point of view of applying the activated carbon-sand process to a conventional bone char filter lies in the fact that bone char averages about 50 lbs. to the cubic foot, and sand averages about 100 lbs. to the cubic foot. A filter designed to carry bone char is, therefore, generally not sufficiently strong to carry sand and activated carbon.

I have discovered that these disadvantages may be substantially overcome. The conventional bone char filter devices may be employed to filter the sugar syrup or melt. Bone char may be used in the first stage and activated carbon may be employed in the second filtering stage, the activated carbon, however, being distributed on and effectively held by a carrier, the combined weight of which may be substantially less than the corresponding amount of bone char normally placed in such filter devices, so that a satisfactorily decolorized liquor may be obtained.

In accordance with my invention, the sugar syrup or melt is subjected to the purifying action of bone char. The sugar melt is separated from the bone char and its adsorbed impurities. The partly purified sugar melt is then treated to the purifying action of powdered activated carbon admixed with finely-granular petroleum coke to remove further amounts of impurities.

In a more specific application of the invention, low volatile petroleum coke is crushed, and the fraction passing through a 10-mesh screen and held on a 100-mesh screen is used as the supporting or carrying medium for the powdered activated carbon. The activated carbon is made into a heavy sludge with sugar syrup and this sludge is then mixed thoroughly with the dry or slightly moist finely-granular petroleum coke.

Experiments made with this material gave very striking results. The filter body of activated carbon and petroleum coke was extremely stable. The activated carbon was held tightly in the pores of the coke particles and practically no black filtrates were obtained. The petroleum coke weighed only about 40 to 45 lbs. per cubic foot, which is somewhat less than the average weight of bone char. In addition, a very rapid flow of liquor was obtained through the filter.

With sand, instead of petroleum coke, a rate of flow equivalent to only about 20 tons of sugar per day per filter can be obtained without a black filtrate resulting. With the petroleum coke carrier, however, the equivalent of about 130 tons per day was obtained without any sign of a black filtrate resulting. The average production of a bone char filter, when in normal operation with bone char alone, is about 100 tons per day. It is clear, therefore, that, if sand is used, far more filters would have to be used for the activated carbon filtration than for the bone char filtration; whereas if petroleum coke is used, the reverse would be the case and the production from the activated carbon filter would certainly balance and probably exceed that from the bone char filter.

It will be seen that this discovery of the peculiarly advantageous properties of the finely-granular petroleum coke is an important one because it offers the possibility of converting bone char refineries to the combined process of bone char and activated carbon by enabling them to use their present equipment. If results on a large scale run parallel to those obtained in the laboratory, a bone char refinery would have ample filter capacity to run the combined process without buying any additional filter presses whatsoever, with the exception that it would probably be advisable to install one or two polishing filters as a safeguard against any activated carbon getting by the petroleum coke filter into the final liquor. There is even a possibility that the capacity of the filter station would be increased, since it appears that the bone char filtration would not require more than one-third of present requirements, and another third should take care of the activated carbon, thus leaving the final third available for extra capacity.

I have discovered a further highly important advantage of the process of the invention. In the ordinary method of using activated carbon, in which the powdered carbon is mixed with the liquid undergoing treatment and then separated from it by filtration through some type of filter press, it is never possible to reach complete exhaustion of the carbon. A balance is reached between the solubility of the impurities in the liquid, and the adsorptive power of the carbon, and normal carbon which has been used in a single filtration still retains from 20 to 30% of its original decolorizing activity. In order to make use of this residual activity, countercurrent methods are commonly used. Incoming liquid is treated with once-used carbon, and the filtrate from this treatment is again filtered with new carbon, which after use is in turn used again for the treatment of more incoming liquid. Even with a two-stage countercurrent system such as this, the twice used carbon still is far from being exhausted. Some attempts have been made to use a three-stage countercurrent process, but as a rule such a system has been found to be so complicated as to be impracticable.

On the other hand, when practicing the method of the present invention, in which the activated carbon is distributed throughout a large mass of finely-granular petroleum coke, the liquors become progressively purified as they travel from the top of the filter to the bottom. From this it follows that the activated carbon at the top of the filter becomes exhausted sooner than that at the bottom, and a point is finally reached where carbon at the top becomes completely exhausted, while that at the bottom stil retains a great deal of its activity. In such a filter, therefore, the effect of an infinite number of countercurrent filtrations may be obtained. This results in a great economy in carbon.

In my laboratory tests of the invention, a filter of activated carbon-petroleum coke has never actually been run to complete exhaustion, because the length of time to reach such a point would be excessive. The filtration was stopped when the liquors flowing from the filter reached a color which was so dark that further filtration seemed pointless. Even at this point, however, I discovered that the same degree of purification can be obtained with approximately 50% of the carbon required in an ordinary batch process of filter press filtration.

It should be understood that the method of the invention is applicable not only to the treatment of cane sugar and beet sugar, but also to corn sugar, for which it is especially suitable, or to any sugar which can be refined by treatment with bone-char or activated carbons or both.

I claim:

1. In the method of refining sugar syrups or melts, the improvement which comprises subjecting the sugar melt to the purifying action of bone char, separating the sugar melt from the bone char and its adsorbed impurities, and then treating the partially purified sugar melt to the purifying action of powdered activated carbon admixed with finely-granular petroleum coke to remove further amounts of impurities.

2. Method according to claim 1, in which the powdered activated carbon is admixed with finely-granular low volatile petroleum coke.

3. Method according to claim 1, in which the sugar melt is filtered by gravity through a mass of the bone char and then a mass of the powdered activated carbon admixed with finely-granular petroleum coke.

4. Method according to claim 1, in which a relatively small amount of the powdered activated carbon is admixed with and distributed throughout a relatively large amount of the finely-granular petroleum coke.

5. Method according to claim 1, in which a filter of the activated carbon-petroleum coke is made by mixing the powdered activated carbon with the sugar syrup or melt to obtain a heavy sludge, and then mixing the sludge with the finely-granular petroleum coke.

6. In the method of refining sugar syrups or melts, the improvement which comprises passing the melt by gravity through a body of bone char, and then passing the filtrate by gravity through a body consisting of powdered activated carbon admixed with finely-granular low-volatile petroleum coke.

7. In the method of refining sugar syrups or melts, the improvement which comprises subjecting the sugar melt to the purifying action of powdered activated carbon admixed with finely granular low-volatile petroleum coke.

LEONARD WICKENDEN.